United States Patent Office 3,305,444
Patented Feb. 21, 1967

3,305,444
ANTI-TUSSIVE
Charles Riviere, 11 Rue de la Ferme,
Neuilly-sur-Seine, France
No Drawing. Filed Sept. 24, 1962, Ser. No. 225,854
Claims priority, application Great Britain, Oct. 4, 1961,
35,713/61
2 Claims. (Cl. 167—55)

The present invention relates to chemical compounds having a therapeutic use.

The compound of the present invention has an important central neurosedative and anti-tussive action, while having much lower toxicity than the other medicaments at present known to have comparable therapeutic action, and comprises the aminoxide of 2-diphenylmethoxy-N,N-dimethylethylamine, of the following formula:

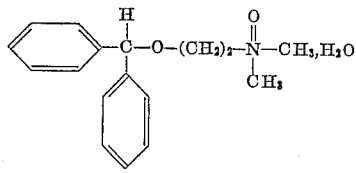

For convenience it is designated herein by the name of diphenhydramine aminoxide.

It can be prepared by the oxidation of diphenhydramine by means of hydrogen peroxide in a methanolic medium. One method of preparation is as follows; 225 g. of diphenhydramine are dissolved in 1 litre of methanol, and cooled down to 5° C. 220 cm.³ of hydrogen peroxide at 30% neutralised (by barium carbonate) are then added drop by drop and in so doing the temperature should not be allowed to rise above 10° C. The solution is left standing for 36 hours while keeping check that it is still neutral. After filtration, 1 g. of platinum black is stirred into it in order to decompose the excess of hydrogen peroxide. Once the oxygen is completely released the solution is concentrated under vacuum in a water-bath until it reaches constant weight.

The compound according to the invention is in the form of a yellow, unodorous (or with a faint amino odor) pasty product with a bitter taste. It is soluble in water, alcohol and acetone, but hardly soluble in ether and petroleum ether. It presents a characteristic ultra-violet spectrum.

For convenience during the isolation, identification and handling of the product, it is prepared as the camphosulfonic acid salt thereof, the pharmacodynamic properties of which are similar.

The diphenhydramine aminoxide camphosulfonate is indeed in the state of a white crystalline powder, with an amine smell and a bitter taste, having a definite melting point at 106° C., and a characteristic UV spectrum $$(E_{1\,cm.}^{1\%} = 9.1 \text{ at } 258.5–259\,m\mu)$$

The compound according to the invention differs fundamentally from diphenhydramine, to the family of which it appears to be closely related by its formula, by virtue on the one hand of a property that diphenhydramine possesses only slightly, i.e. its success in producing an anti-tussive effect, and on the other hand by a quite remarkable absence of toxicity.

The medicament according to the invention has interesting effects in three fields, namely an anti-histamic and anti-spasmodic action, an hypothermising action and an anti-tussive action.

I observe that, whether by intravenous or oral administration, the toxicity of the compound according to the invention is of the order of 6.2–6.8 times less than that of diphenhydramin. It is precisely because of this mild toxicity that the therapeutic activity of this compound is of still greater interest.

The medicament according to the invention has been clinically tested in the form of a syrup upon more than 250 patients, aged from 8 months to 12 years old, and it has been thus confirmed that, with the first-aged babies, the administration of the product has been easy, giving rise to no intolerance manifestation.

The therapeutic efficiency of the product, has been confirmed upon said patients on the basis of an indisputable criterion, i.e. the decreasing of cough immediately after administration of the product. It has been thus shown that in 80% of the cases, the product had an effective action upon cough, with a rapid disappearance of cough. Said activity is clear whatever the age of the child and whether the mechanism of cough, i.e. whether its origin be viral, bacterial, allergic and the starting area be pharyngeal, laryngotracheal, bronchic or pleural.

Particularly in the spasmodic cough of asthmatics, the new medicament is active whereas the hitherto known anti-tussive medicaments had failed.

Besides, this anti-tussive action, the new medicament has proved itself to have a neurosedative activity, being demonstrated clearly upon the behavior of patients, and giving rise together to an improvement of the sleep.

The posology administered to said patients was generally of 10 mg./kg. but no occurrence of unfavorable affect has been noticed with doses rising up to 20 mg./kg.

What I claim is:
1. The camphosulfonic acid salt of diphenhydramin aminoxide having anti-tussive and neurosedative properties.
2. A composition comprising the compound of claim 1 in a syrup base.

References Cited by the Examiner
UNITED STATES PATENTS

| | | | |
|---|---|---|---|
| 2,785,170 | 3/1957 | Kagan | 167—65 |
| 2,785,171 | 3/1957 | Birkenmeyer | 167—65 |

OTHER REFERENCES

Chem. Abst. Sixth Collective Index, 1957–1961, page 2342S.

Chemical Abstract, Subject Index, vol. 55, July–December 1961 page 731S.

Feinberg: The Antihistamines—1950, The Year Book Publishers Inc., Chicago, Ill., pages 44 and 45.

Takagi: Chem. Abst., vol. 55, July 10, 1961, page 13771e.

SAM ROSEN, Primary Examiner.

JULIAN S. LEVITT, F. CACCIAPAGLIA, Examiners.